United States Patent [19]
Batarseh et al.

[11] Patent Number: 6,081,410
[45] Date of Patent: Jun. 27, 2000

[54] COIN DISKS

[75] Inventors: Issa Batarseh; Zhihua Qu, both of Oviedo; Samuel Richie, Orlando, all of Fla.

[73] Assignee: University of Central Florida, Orlando, Fla.

[21] Appl. No.: 09/106,641

[22] Filed: Jun. 29, 1998

[51] Int. Cl.[7] .................................................. G11B 23/03
[52] U.S. Cl. ............................................................. 360/133
[58] Field of Search ............................. 360/97.01, 98.01, 360/132, 133; 369/291; 206/308.3

[56] References Cited

U.S. PATENT DOCUMENTS

| | | | |
|---|---|---|---|
| 3,526,884 | 9/1970 | Buslik et al. | |
| 5,253,133 | 10/1993 | Guo | 360/97.01 |
| 5,420,739 | 5/1995 | Yokozawa et al. | 360/137 |
| 5,579,297 | 11/1996 | Childers et al. | 369/291 |
| 5,841,605 | 11/1998 | Foster et al. | 360/97.01 |
| 5,867,476 | 2/1999 | Yoshida et al. | 369/289 |

*Primary Examiner*—William Klimowicz
*Attorney, Agent, or Firm*—Brian S. Steinberger; Law Offices of Brian S. Steinberger

[57] ABSTRACT

A floppy disk cartridge adapter having a removable coin shaped memory disk. The 3 & ½ inch size cartridge adapter can fit into conventional personal computer disk drives. The small coin shaped magnetic disk has a diameter of approximately 1 inch, and can be easily snapped into and removed from the cartridge adapter. The coin disk fits on a spindle that is side by side to the floating drive plate used in regular 3 & ½ inch floppy diskettes. The spindle can be attached by various drive systems to rotate simultaneously with the rotating drive plate. One version is belt driven, another has the coin disk snap onto a spindle supported wheel whose sides frictionally rub against the drive plate wheel, and a third version has the coin disk snap onto the spindle supported gear wheel whose sides contain teeth which mateably engage like side teeth on the drive plate wheel. The coin disk can alternatively be inserted into a separate casing having a spring loaded shutter so that the conventional disk drive being used can access the magnetic sides of the coin disk by sliding the shutter. When removed from the cartridge adapter, the disk can be inserted into a small clip retainer which has a paper clip edge allowing the coin shaped disk to be portably mounted on papers, cardboard, clipboards and the like.

17 Claims, 11 Drawing Sheets

2
Sliding shutter

3
Case

4
Disk

7
Drive Plate

5
Drive Head
Access Window
(Top and Bottom)

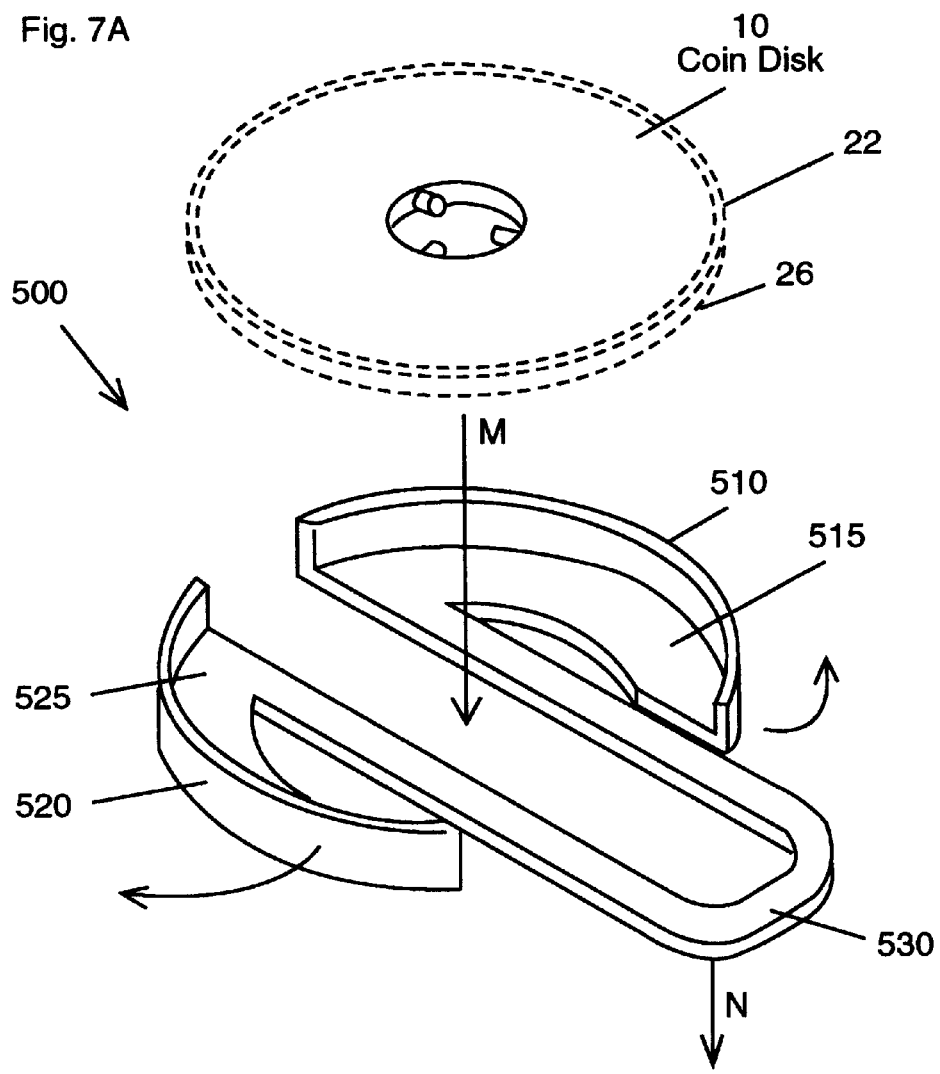

COIN DISKS

This invention relates to computer memory discs, and in particular to an floppy disk sized adapter device that allows removable coin sized disks to record information within conventional personal computer disk drivers.

BACKGROUND AND PRIOR ART

Conventional computer disk drivers on IBM compatible personal computers (PCs) such as those from Compaq, Hewlett Packard, Texas Instruments and even Apple generally use a standard 3 & ½ inch floppy diskette cartridges. It has become a wide practice for persons to manually pass these floppy diskettes around when updating and submitting papers to other parties. Typically, the only way of protecting a single 3&½ inch floppy diskette cartridges is to use the paper type sleeve they come in. However, there are problems with being able to manually transport individual diskette cartridges. The paper sleeves are usually paper-thin, easily wear and become torn after a short use. Additionally, the size of these floppy diskette cartridges makes them difficult to attach to hardcopy paper versions with traditional fastening means such as paper clips. The large size of these cartridges can cause the cartridge to become separated from the attached paper and become lost. Furthermore, the bulky 3 & ½ inch rigid square shape of the cartridge requires a storage space of at least those dimensions. The large plastic carrying cases which hold multiple disks are too cumbersome to be used for holding just a single disk. Most 3 & ½ inch floppy diskettes that pass around offices utilize less than 20 to 30% of their storage space resulting in substantial wasted space. Furthermore most 3 & ½ inch diskettes are not passed around in protective paper type sleeves, and as a result the magnetic disk in the diskette cartridges can become demagnetized and even damaged from normal wear and tear.

Cartridge and disk adapters have been proposed over the past several years, but fail to overcome all the problems described above. U.S. Pat. No. 5,208,802 to Suzuki et al. describes a disk adapter for a disk cartridge that uses a spacer-component to fill in the space about smaller sized disks. However, Suzuki '802 requires using a separate plastic disk adapter piece as the spacer-component that detaches from the cartridge housing and thus can become easily damaged, and lost. Furthermore, both this plastic adapter piece and the disk must each be inserted and snapped into place within the housing between uses which would tend to wear out the plastic adapter over time and thus not allow it to be readily reusable. U.S. Pat. No. 5,150,354 to Iwata et al. describes a disk cartridge having a hinged side opening for allowing only a full size magnetic disk to be inserted therein. U.S. Pat. No. 5,475,674 to Yamashita et al. describes a disc case that is limited to only holding full-sized removable magnetic disks. U.S. Pat. Nos.: 5,331,627 to Childers et al.; 5,677,898 to Hasegawa et al. and 5,715,233 to Yoshida et al. each describes cartridge adapter devices where one or more smaller cartridges(each housing a disk) can be inserted into a larger cartridge so that the smaller cartridge can work in computers that take the larger cartridges.

SUMMARY OF THE INVENTION

The first objective of the present invention is to provide a 3 & ½ inch floppy disk cartridge useful for computers with a removable and reusable 1 inch coin-sized magnetic disk.

The second object of this invention is to provide a portable computer useable coin shaped magnetic disc that can be handheld and easily stored.

The third object of this invention is to provide a storage holder for a coin sized magnetic storage media that can easily clip onto papers allowing the storage media to be easily transportable.

A preferred embodiment of the adapter cartridge includes a cartridge in the shape of a floppy diskette, a drive plate rotatably attached within the cartridge, a coin shaped magnetic disk connected to the cartridge, and a drive system for allowing the disk to rotate simultaneously with the drive plate. In operation, the cartridge being inserted into a computer disk drive allows the magnetic disk to record and play back data. The magnetic disk can be removed for separate transport and storage from the cartridge. The cartridge can have exterior dimensions of approximately 3.55 inches wide, approximately 3.70 inches long and approximately 0.13 inches thick The magnetic disk can have a diameter of approximately 1 inch. A spindle in the cartridge allows the magnetic disk to be removably attached to the cartridge so that that the magnetic disk is side by side to the drive plate.

A first version of the drive system can have a belt connecting the rotating drive plate to the magnetic disk so that the drive plate and the magnetic disk simultaneously rotates in the same direction. The drive plate and the coin disk spin axis are joined by a flexible belt. A small pulley is attached to the drive plate and concentrically aligned with the drive plate spin axis. A second pulley mates with the coin disk and is concentrically aligned with the coin disk spin axis. A small belt wraps about the two pulleys. When the drive plate turns, it spins the drive plate pulley which moves the belt which turns the coin disk pulley which spins the coin disk. Equal drive plate pulley and coin disk pulley diameters assure the coin disk spins at the normal angular velocity of the drive.

A second version of the drive system can have a plate wheel supporting the magnetic disk and having rough side edges which abut against rough side edges on the drive plate, so that rotating the drive plate in one direction simultaneously by friction rotates the plate wheel in an opposite direction. A drive plate friction disk is attached to the drive plate and concentrically aligned with the drive plate spin axis. A coin disk friction plate mates with the coin disk and is concentrically aligned with the coin disk spin axis. The two friction disks contact each other at a tangent point with some force between the two friction disks at this pressure point. The friction disks will be made of a material, such as hard rubber, which offer significant frictional force at the pressure point. This assures that the coin disk spins true when the drive plate spins and prevents slippage between the coin disk and the drive plate as they both turn.

A third version of the drive system has a gear wheel for supporting the magnetic disk, the plate wheel having side teeth which mateably interconnect to side teeth on the drive plate, so that rotating the drive plate in one direction simultaneously rotates the gear wheel in an opposite direction. Here a coin disk gear is driven by a drive plate gear. The drive plate gear is attached to the normal drive plate and is concentrically aligned with the drive plate spin axis. The coin disk gear mates to the coin disk and is concentrically aligned with the drive plate spin axis. The coin disk gear mates to the coin disk and concentrically aligned with the coin disk spin axis. Both gears mesh together at a tangent point and when the drive turns the drive plate, the gears turn the coin disk. Equal gear diameters and equal numbers of teeth on both gears assure that the coin disks angular velocity is equal to the normal drive velocity.

A novel attachment device sized slightly larger than the coin disk can be used for attaching the coin disk to a single sheet of paper, a stack of paper, cardboard and even a clipboard. The attachment device has a compartment for snapably receiving side edges of the coin disk therein, and a clip for attaching the device to the edge of the sheet.

Further objects and advantages of this invention will be apparent from the following detailed description of a presently preferred embodiment which is illustrated schematically in the accompanying drawings.

BRIEF DESCRIPTION OF THE FIGURES

FIG. 7A is an enlarged exploded view of a novel attachment device for the novel coin disk of the preceding figures.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1A:
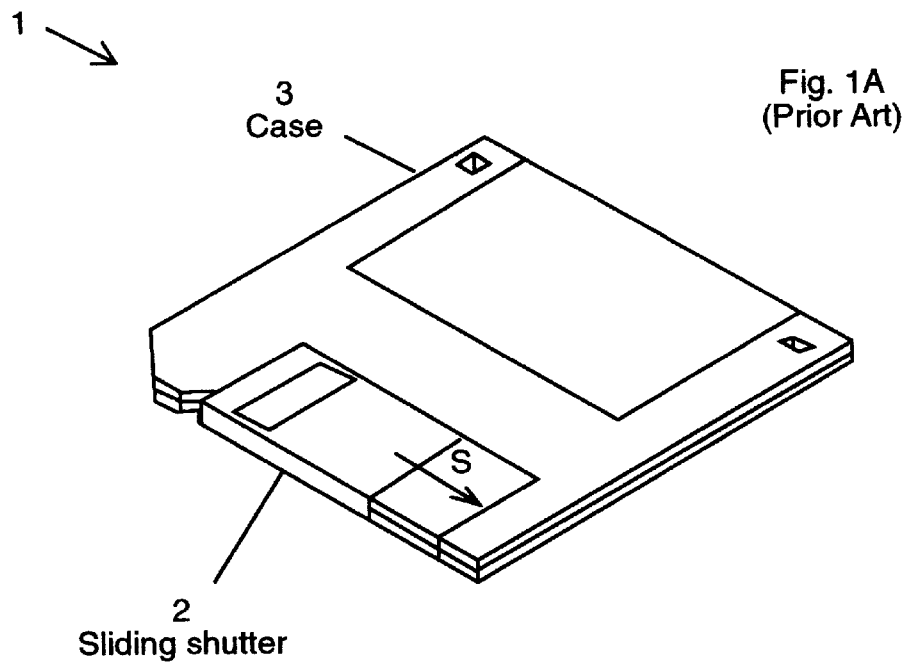
FIG. 1A is a perspective view of a prior art 3 & ½ inch floppy disk cartridge.
Figure 1B:
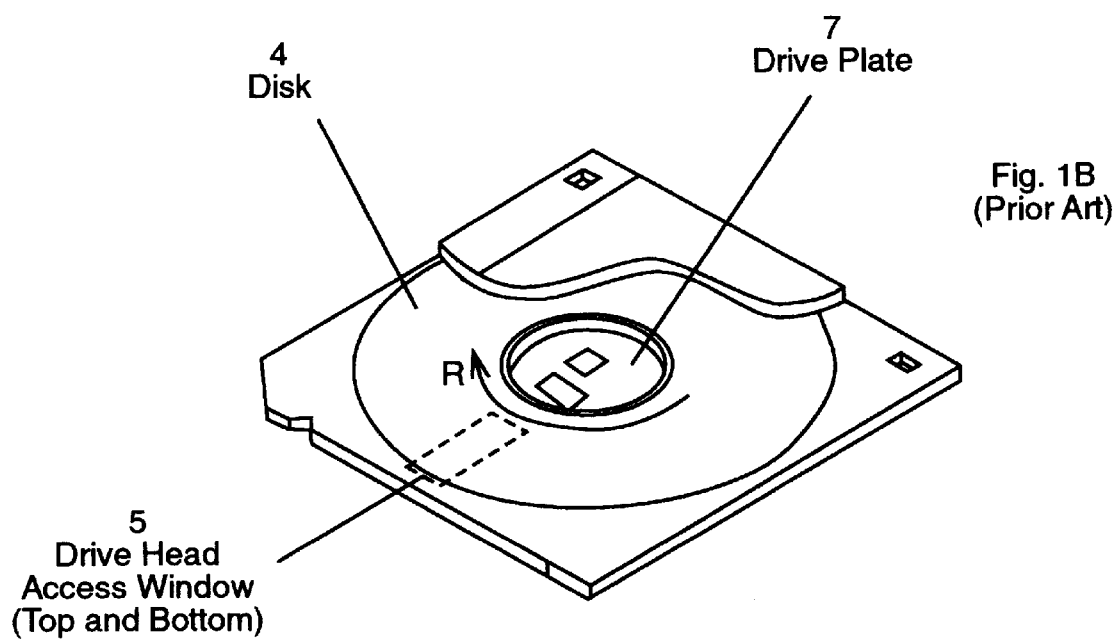
FIG. 1B is a partial exposed view of the magnetic disk within the cartridge of FIG. 1A.

FIG. 1A is a perspective view of a prior art 3 & ½ inch floppy diskette/cartridge 1. FIG. 1B is a partial exposed view of the magnetic disk 4 within the cartridge 1 of FIG. 1A. Referring to FIGS. 1A–1B, prior art cartridge 1 can be a standard 3 & ½ inch floppy diskette/cartridge(2HD) having a recording capacity of 1.44 MB when formatted, such as but not limited to those manufactured by Iomega, Syguest, Teac, Verbatim, Sony, 3-M, Maxwell, TDK and the like. The standard floppy diskette 1 generally consists of a thin plastic rectangular case 3 approximately 3.55 inches wide, approximately 3.70 inches long and approximately 0.13 inches thick. The magnetic disk 4 inside of case 3, is formed from a round, thin sheet of flexible plastic impregnated with a magnetic material having a diameter of approximately 3.37 inches and a thickness of approximately 0.003 inches (approximately the thickness of a sheet of paper). Glued to the center of disk 4 is a thin metal drive plate 7 which acts like a spindle allowing the disk to rotate in the direction of arrow R. The standard floppy disk 1 of FIGS. 1A–1B includes a sliding shutter 2 which slides in the direction of arrow S on one end of case 3. Under the shutter is an access window 5 located on both sides of case 3 which opens to the magnetic media disk 4. When the diskette/cartridge 1 is inserted into a conventional disk drive, the drive spindle of the disk drive(both not shown since they are not part of the invention), the drive spindle engages the round metal drive plate 7 on the diskette/cartridge and spins the disk 4 at a preselected angular velocity. As the disk 4 spins in the direction of arrow R, heads inside the disk drive read the surfaces of the magnetic disk 4.

Figure 2A:
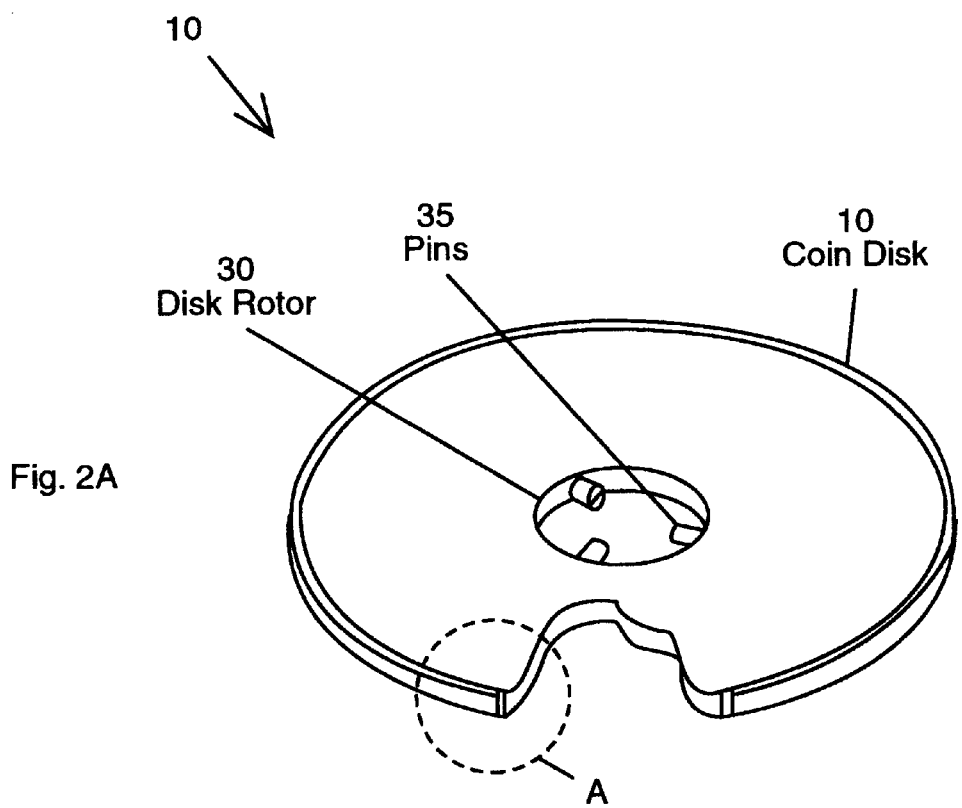
FIG. 2A is a perspective view of a novel coin disk used in the subject invention.
Figure 2B:
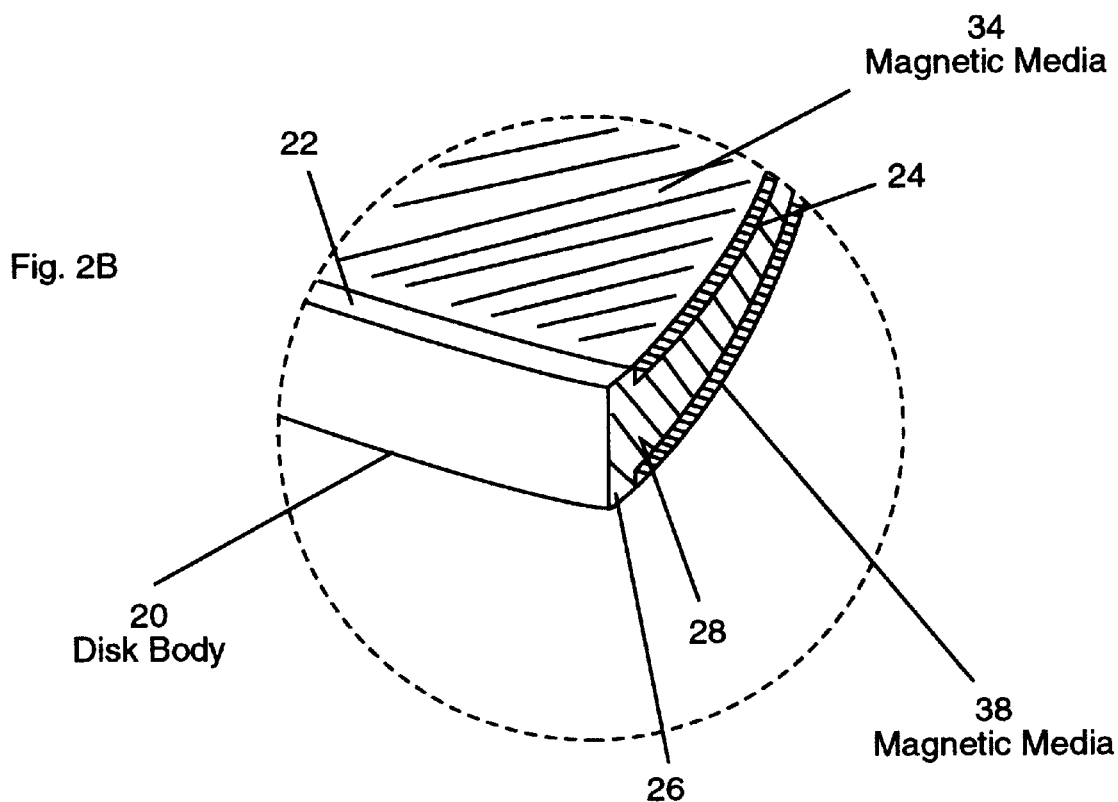
FIG. 2B is an enlarged cut-out section of the coin disk of FIG. 2A along arrow A.

FIG. 2A is a perspective view of a novel coin disk 10 used in the subject invention. FIG. 2B is an enlarged cut-out section of the coin disk 10 of FIG. 2A along arrow A. Referring to FIGS. 2A–2B, novel coin disk 10 is comprised of a plastic disk body base 20 having an upper external raised lip edge 22 above a top planar surface 24, and a lower external raised lip edge 26 above a bottom planar surface 28. A top magnetic layer 34 adheres to the top surface 24, while a bottom magnetic layer 38 is adhered to the bottom surface 28. A cylindrical opening 30 forms the disk rotor area of which will be explained in greater detail in reference to FIGS. 3A–3G, includes approximately three inwardly projecting plastic pins 35. Novel coin disk 10 can have an overall diameter of approximately 1.0 inches(the approximate diameter of a quarter), and a thickness of approximately 0.09 inches.

Figure 3A:
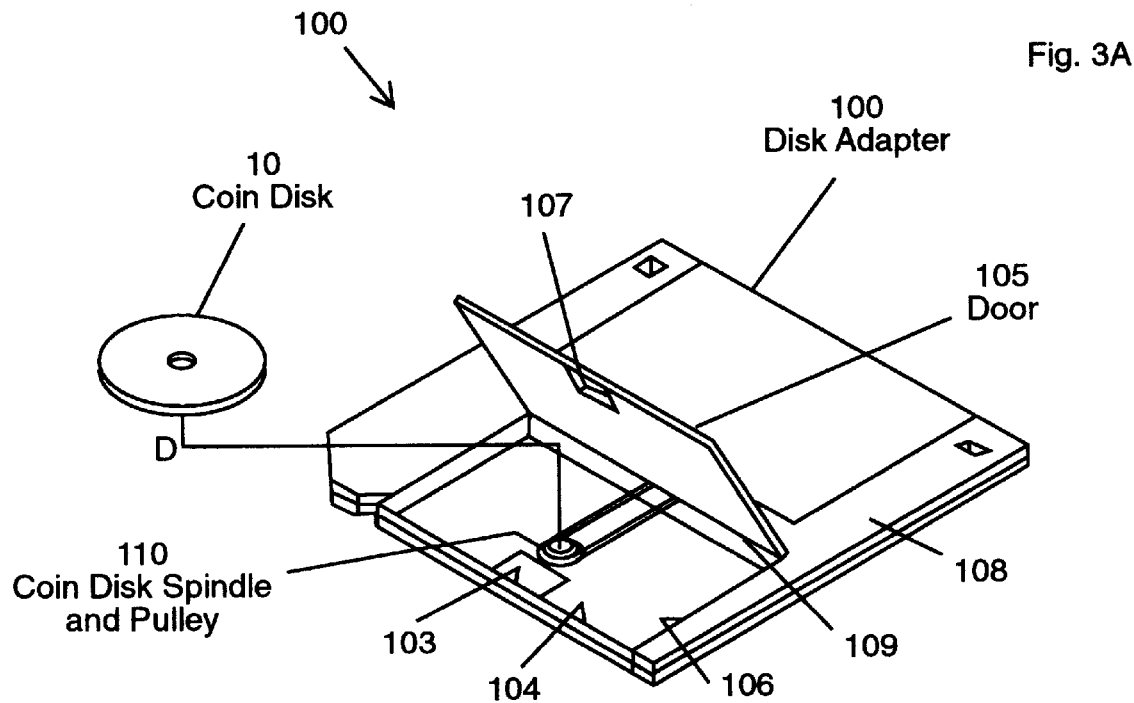
FIG. 3A is a perspective view of a first preferred embodiment of using the novel coin disk of FIGS. 2A–2B in a novel adapter cartridge.
Figure 3B:
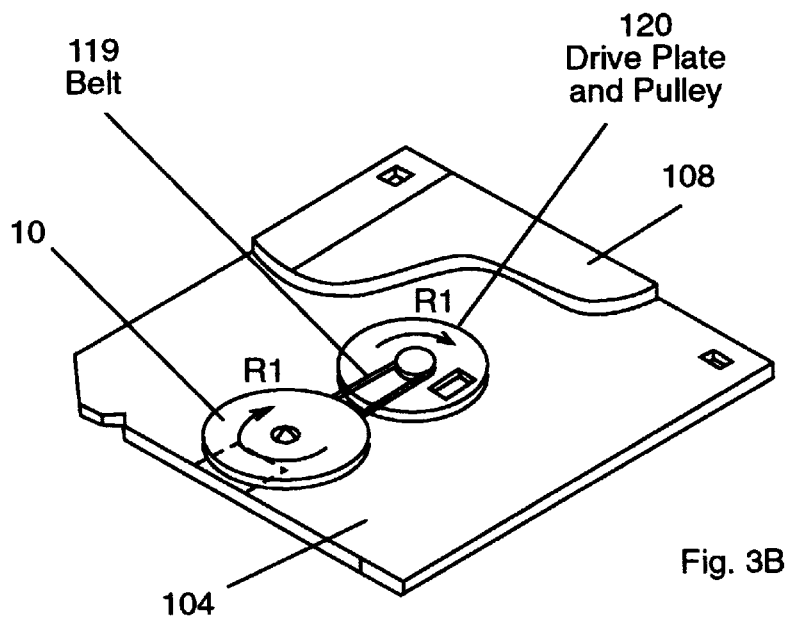
FIG. 3B is a partial exposed view of the interior of the novel adapter cartridge of FIG. 3A.
Figure 3C:
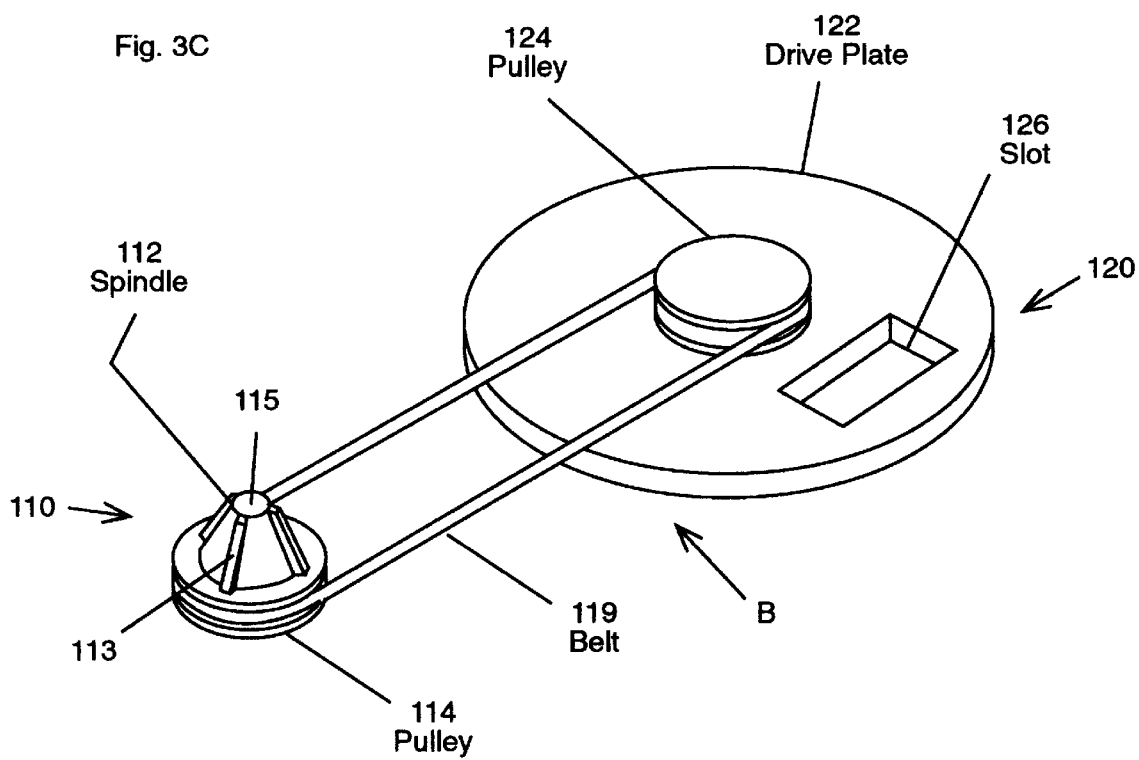
FIG. 3C is an enlarged view of the belt drive system of the adapter cartridge of FIGS. 3A–3B.
Figure 3D:
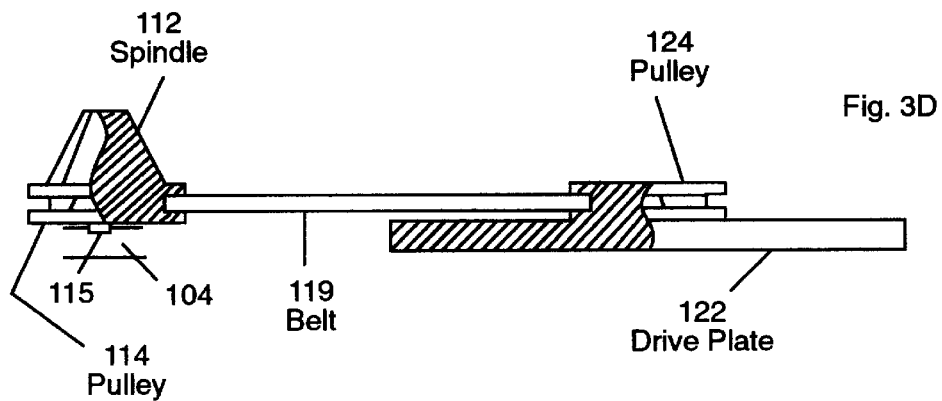
FIG. 3D is a side view of the belt drive system of FIG. 3C along arrow B.
Figure 3E:
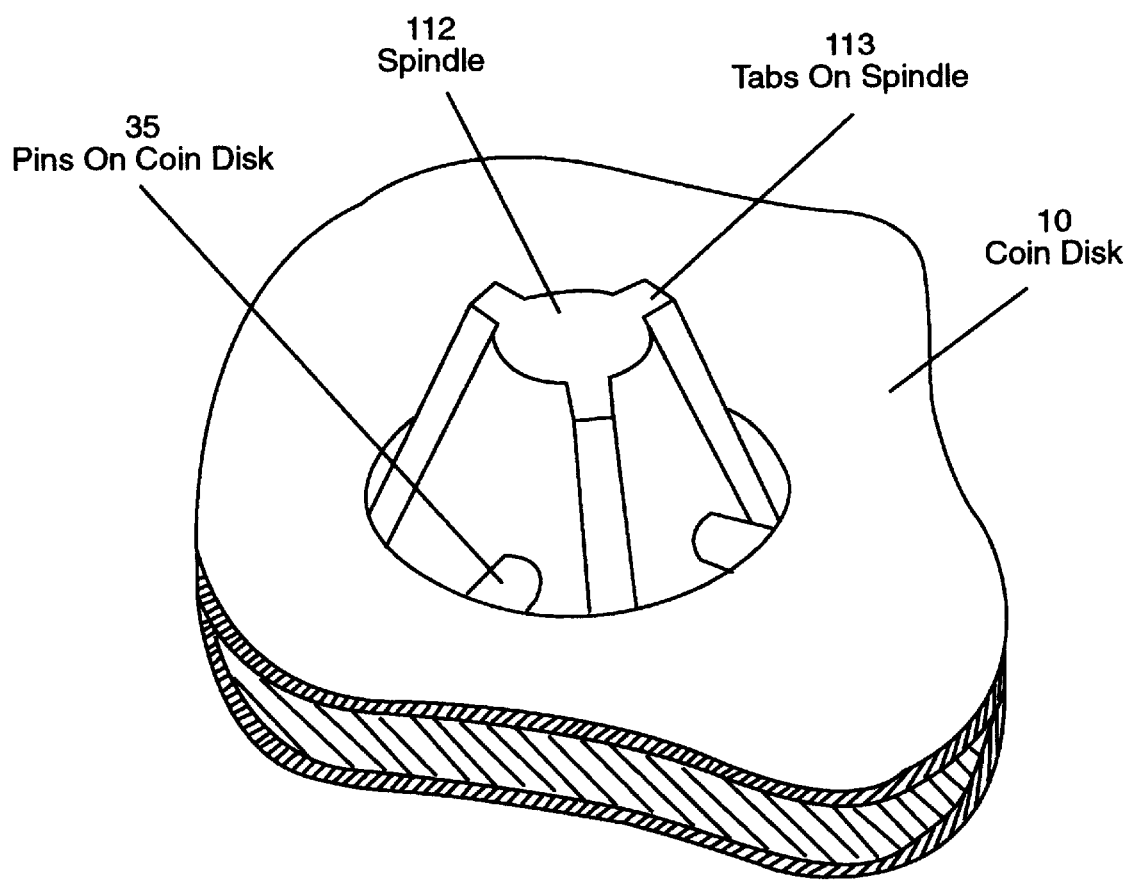
FIG. 3E is an enlarged view of the novel disk on the spindle in the cartridge of FIG. 3B.

FIG. 3A is a perspective view of a first preferred embodiment 100 of using the novel coin disk 10 of FIGS. 2A–2B in a novel adapter cartridge 100. FIG. 3B is a partial exposed view of the interior of the novel adapter cartridge 100 of FIG. 3A. FIG. 3C is an enlarged view of the belt drive system 110, 120 of the adapter cartridge 100 of FIGS. 3A–3B. FIG. 3D is a side view of the belt drive system 110, 120 of FIG. 3C along arrow B. FIG. 3E is an enlarged view of the novel disk 10 on the spindle 112 in the cartridge 100 of FIG. 3B.

Referring to FIGS. 3A–3E, cartridge 100 is a thin plastic rectangular case having overall dimensions identical to the floppy disks of the prior art being approximately 3.55 inches wide, approximately 3.70 inches long and approximately 0.13 inches thick. Novel cartridge 100 includes a upper door 105 with a top drive head access window 107, hingedly connected 109 to the cartridge body 100. Door 105 can tightly snap into opening 106 of the upper surface 108 of the cartridge 100. Opposite the top drive head access window 107 is a bottom drive head access window 103 bottom surface 104 of the cartridge 100.

Referring to FIGS. 3A–3D, spindle 112 has a center hole for mounting about an axle pin 115 which is secured to lower bottom floor 104 of the cartridge 100, so that spindle 112 and an adhered to pulley 114 can rotate relative to the cartridge 100. A drive plate 122 with slot similar to the like components described in reference to FIGS. 1A–1B, similarly floatably fits within the bottom portion of the cartridge 100. The novel drive plate 122 includes an upper surface attached pulley 124 which connects to pulley 114 by a belt 119 such as a rubber band, and the like.

Referring to FIGS. 3A and 3E, coin disk 10 is inserted into cartridge 100 by manually inserting the disk 10 in the direction of arrow D so that the pins 35 of the disk 10 abut between the tabs 113 on the spindle 112 locking the disk 10 in place. Referring to FIG. 3B, drive plate 120 rotating in the direction of arrow R1 uses the pulley 119 to simultaneously rotate disk 10 in the same direction of R1.

Figure 3F:
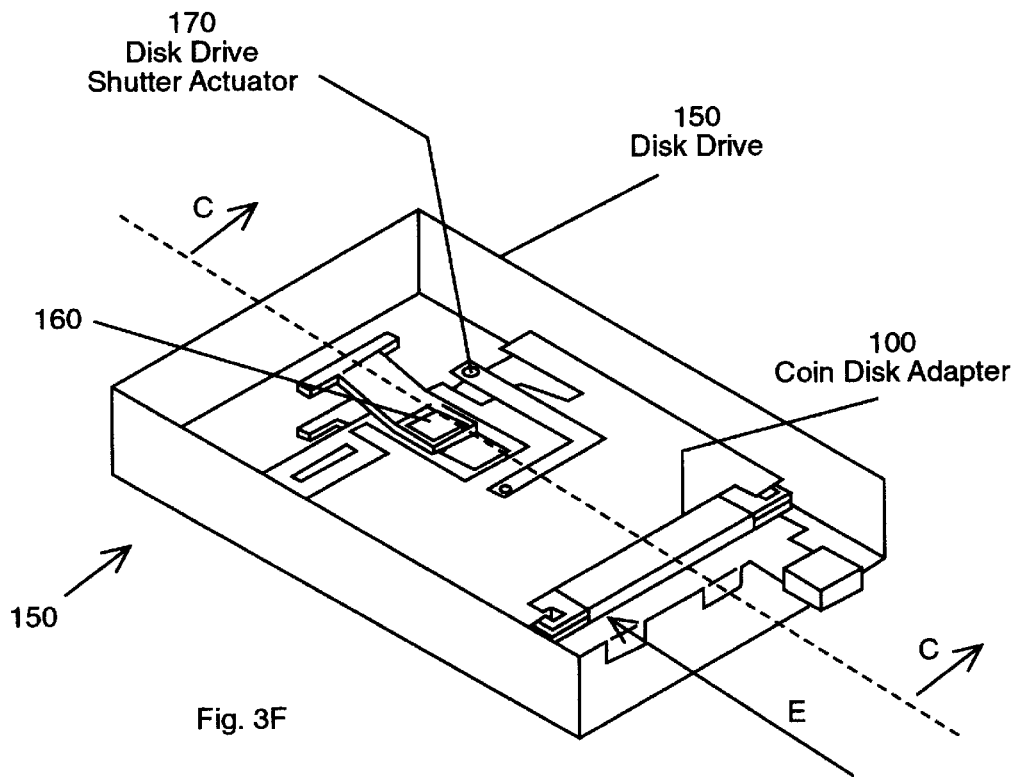
FIG. 3F is perspective view of the adapter cartridge of the preceding figures inserted into a conventional disk drive.
Figure 3G:
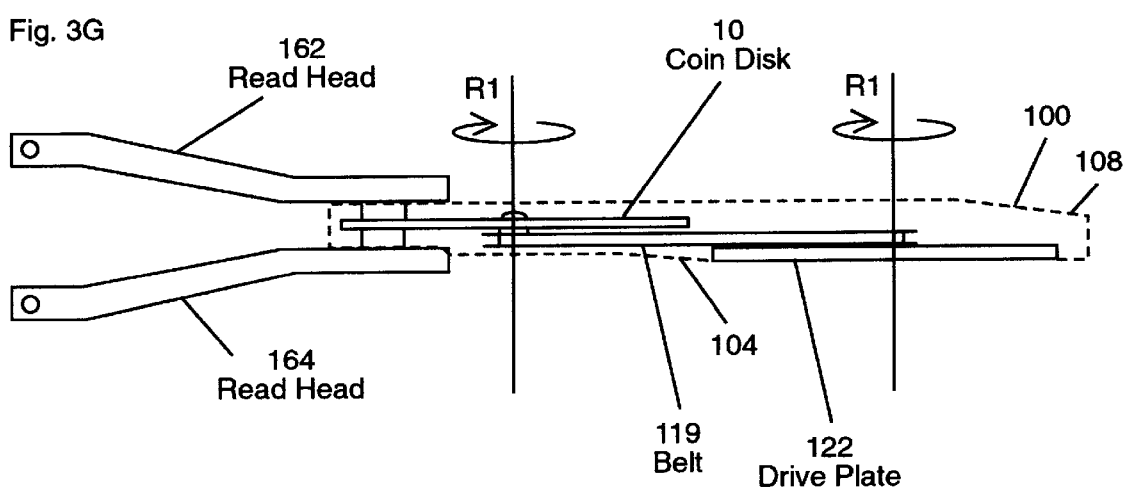
FIG. 3G is a side view of the adapter cartridge and disk drive of FIG. 3F along arrow C.

FIG. 3F is perspective view of the adapter cartridge 100 of preceding FIGS. 3A–3E inserted into a conventional disk drive 150 of a PC computer. The novel cartridge 100 is inserted inside conventional disk drive 150 as a conventional cartridge of FIGS. 1A–1B is done. FIG. 3G is a side view of the adapter cartridge 100 and disk drive 150 of FIG. 3F along arrow C. Referring to FIGS. 3F–3G, novel cartridge 100 is inserted in the direction of arrow E into the disk drive 150 in the same manner as conventional floppy diskettes are used. The read heads 160 of the disk drive 150 have a top read head 162 which can access the rotating magnetic coin disk 10 through the top drivehead access window 107 (shown in FIG. 3A) in upper surface 108 of the cartridge 100, while the bottom read head 164 accesses the rotating magnetic coin disk 10 through the bottom drivehead access window 103(shown in FIG. 3A) in the bottom surface 104 of the cartridge 100. Note that the conventional disk drive shutter actuator 170 on disk drive 150 is still operable to open the sliding shutter usually found on traditional 3&½ inch floppy diskettes. Again drive plate 122 rotating in the direction of arrow R1 by way of belt 119 causes coin disk 10 simultaneously to rotate in the same direction.

Figure 4:
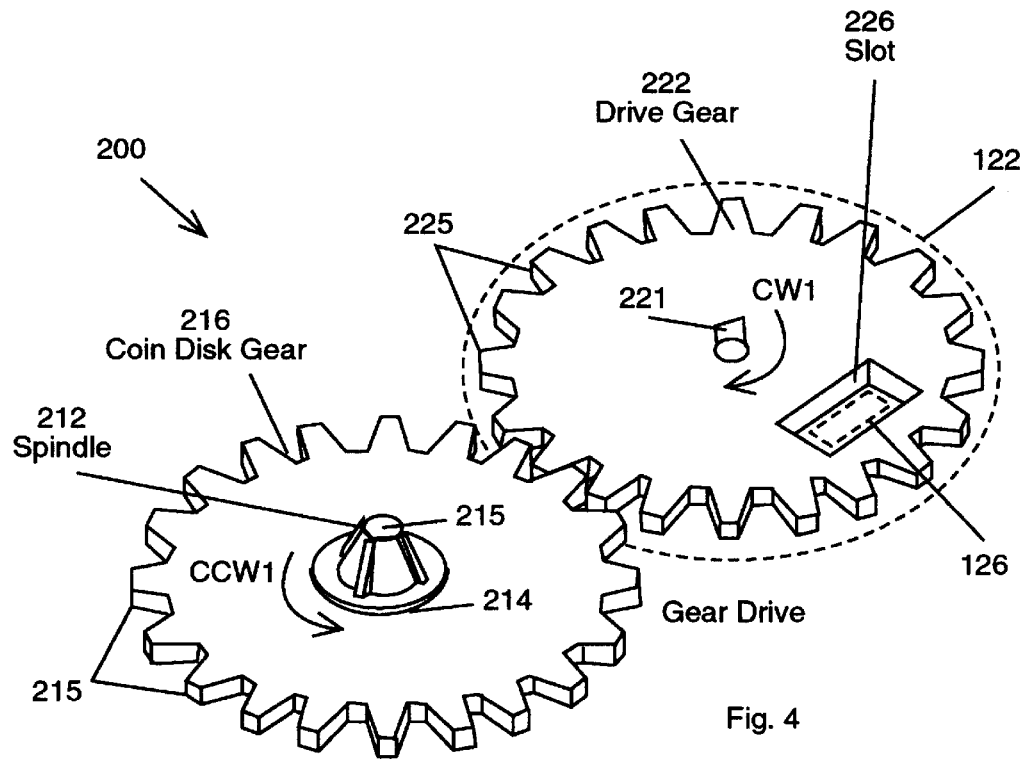
FIG. 4 is an enlarged perspective view of a second preferred embodiment drive system for use in the novel cartridge shown in FIGS. 3A and 3B.

FIG. 4 is an enlarged perspective view 200 of a second preferred embodiment drive system for use in the novel cartridge shown in FIGS. 3A and 3B. Referring to FIG. 4, second preferred embodiment includes a drive gear wheel 222 having outer teeth edges 225 which has a lower end that is fixedly secured to a drive plate 122(similar to the like numbered drive plate of FIG. 3C), by a center pin 221. A slot 226 passes through a bottom slot 126 of drive plate 122. Together drive gear wheel 222 and drive plate 122 functions similarly to the like components described in reference to FIGS. 1A–1B, so that drive gear wheel 222 and drive plate 122 fit and float within the bottom portion of the cartridge 100. Spindle 212 and axle pin 215 and pulley 214 correspond and function similarly to like components 112, 115 and 114, respectively of FIGS. 3C–3D. In embodiment 200, a circular coin disk gear wheel 216 with outer teeth edges 215 is fixably attached about the pulley 214 so that the respective teeth 215 and 225 of both gear wheels 216 and 222 rotate simultaneously with one another. In operation, the novel coin disk 10 of FIGS. 2A–2B is inserted and removed from spindle 212 and functions similarly to the previous embodiment. Note that when drive gear wheel 222 is rotating clockwise(CW), the coin disk gear wheel 216 is rotating counter-clockwise(CCW). Even though the removably attached memory disk 10 rotates in an opposite direction to the drive plate 122, the same angular rate of speed is maintained and data is recorded and/or played back similarly to that of the previous embodiment.

Figure 5:
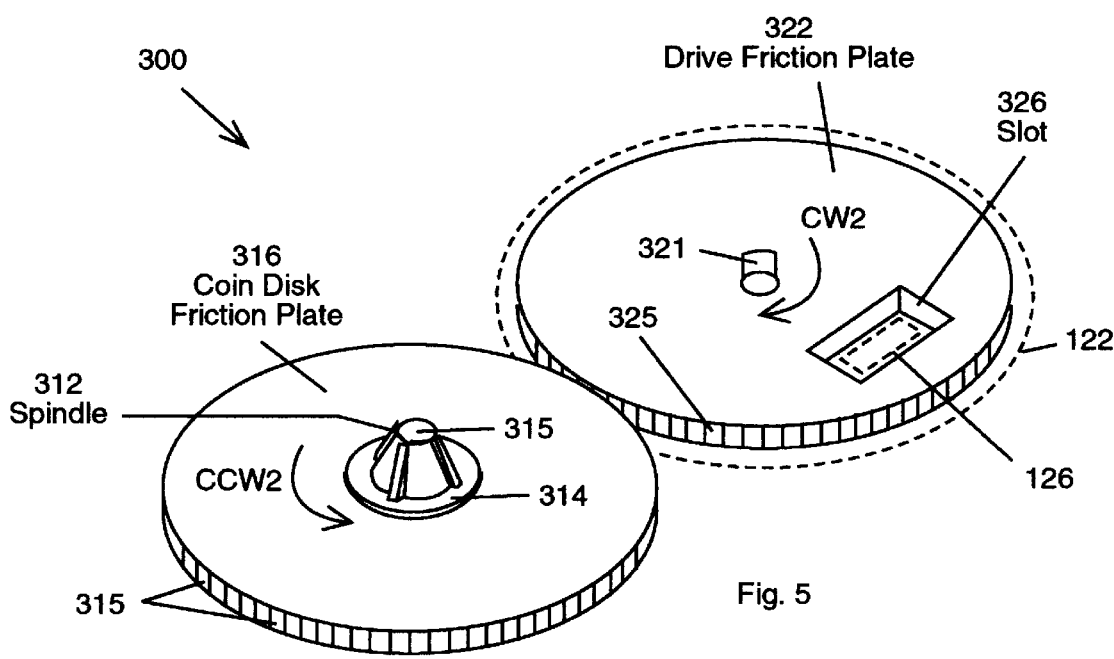
FIG. 5 is an enlarged perspective view of a third preferred embodiment drive system for use in the novel cartridge shown in FIGS. 3A and 3B.

FIG. 5 is an enlarged perspective view 300 of a third preferred embodiment drive system for use in the novel cartridge shown in FIGS. 3A and 3B. Referring to FIG. 5, third preferred embodiment 300 includes a drive friction plate 322 having outer roughened exterior side edges 325 (such as grooves, rubber edges, and the like) which has a lower end that is fixedly secured to a drive plate 122(similar to the like numbered drive plate of FIG. 3C), by a center pin 321. A slot 326 passes through a bottom slot 126 of drive plate 122. Together drive friction plate 322 and drive plate 122 functions similarly to the like components described in reference to FIGS. 1A–1B, so that drive friction plate 322 and drive plate 122 fit and float within the bottom portion of the cartridge 100. Spindle 312 and axle pin 315 and pulley 314 correspond and function similarly to like components 112, 115 and 114, respectively of FIGS. 3C–3D. In embodiment 300, a coin disk gear wheel 316 with roughened exterior side edges 315(such as grooves, rubber edges, and the like) is fixably attached about the pulley 314 so that the respective edges 315 and 325 of both plates 316 and 322 rotate simultaneously with one another. In operation, the novel coin disk 10 of FIGS. 2A–2B is inserted and removed on the spindle 3112 and functions similarly to the previous embodiments. Note that when drive friction plate 322 is rotating clockwise(CW), the coin disk friction plate 316 is rotating counter-clockwise(CCW). Even though the memory disk 10 rotates in an opposite direction, the same angular rate of speed is maintained and data is recorded and/or played back similarly to that of the previous embodiment.

Figure 6A:
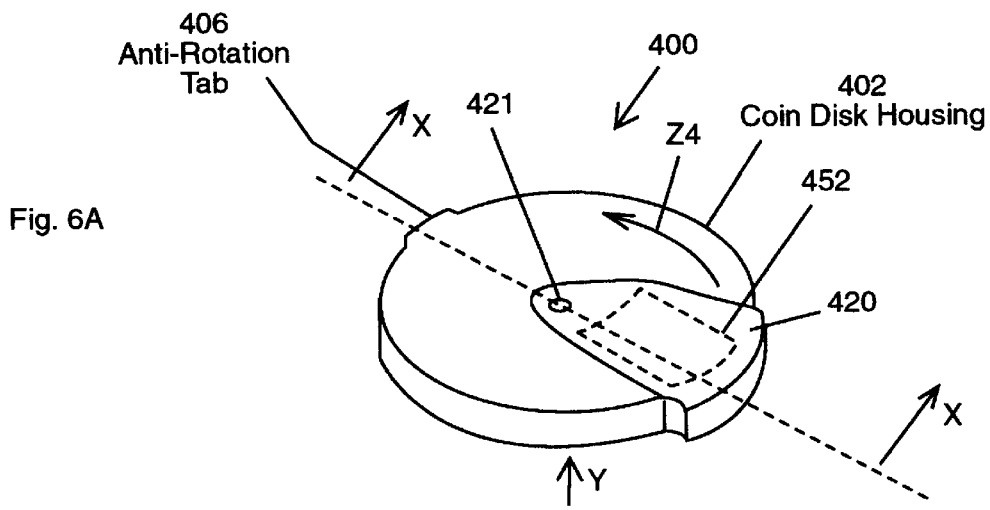
FIG. 6A is a top perspective view of an alternative housing for the coin disk of FIGS. 2A–2B.
Figure 6B:
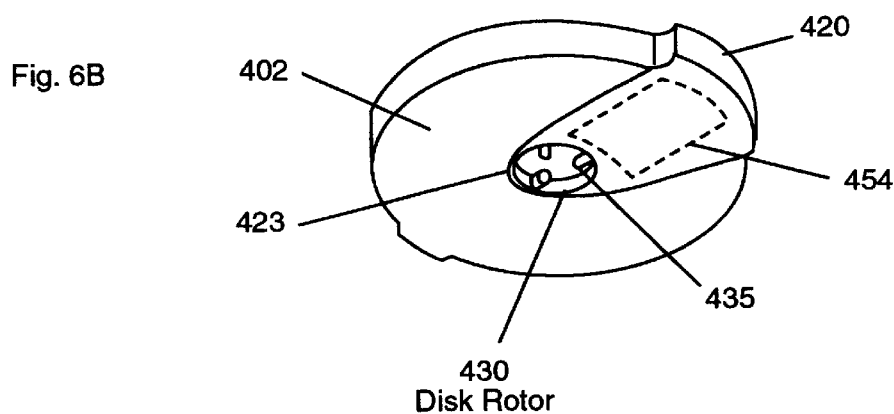
FIG. 6B is a bottom perspective view of the housing of FIG. 6A along arrow Y.
Figure 6C:
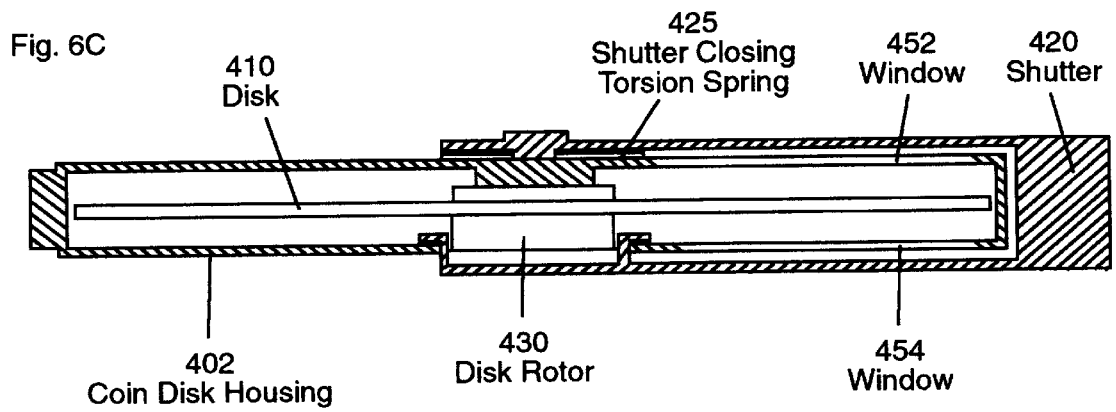
FIG. 6C is a side cross-sectional view of the housing of FIG. 6A along arrow X.
Figure 6D:
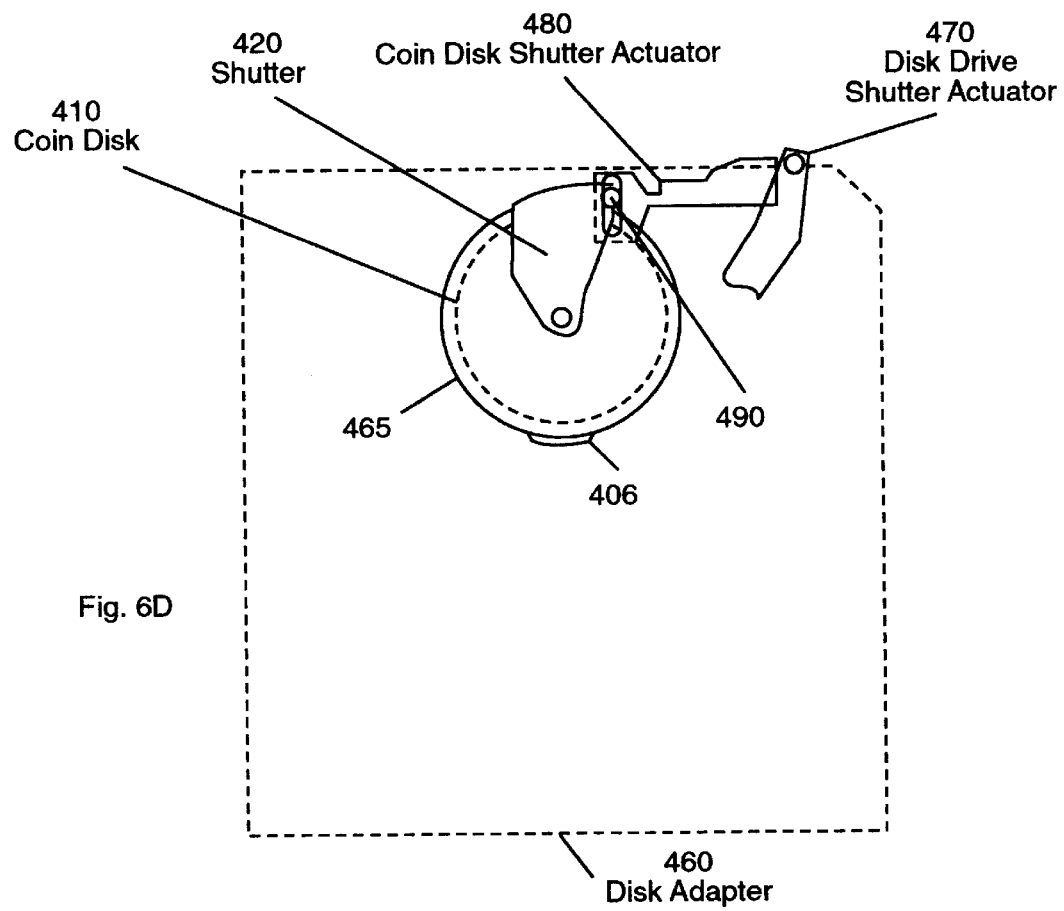
FIG. 6D is a top view of the coin housing of FIG. 6A mounted in the cartridge adapter of FIG. 3A.
Figure 6E:
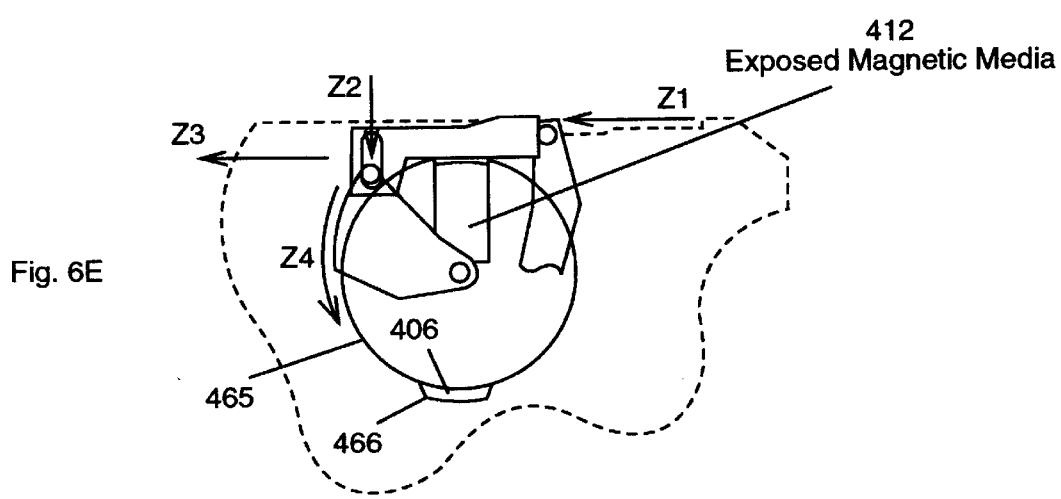
FIG. 6E is an enlarged view of the housing portion of coin disk of FIG. 6D.

FIG. 6A is a top perspective view 400 of an alternative housing 402 for the coin disk 10(now renumbered 410) of FIGS. 2A–2B. FIG. 6B is a bottom perspective view of the housing 402 of FIG. 6A along arrow Y. FIG. 6C is a side cross-sectional view of the housing 402 of FIG. 6A along arrow X. FIG. 6D is a top view of the coin housing 402 of FIG. 6A mounted in the cartridge adapter 100(now renumbered 460) of FIG. 3A. FIG. 6E is an enlarged view of the coin disk housing 400 of FIG. 6D.

Referring to FIGS. 6A–6E, a plastic coin disk housing 402 has a coin disk 410(corresponding to coin disk 10 of FIGS. 2A–2B) inserted therein. A central disk rotor opening 430 has interior protruding pins 435(corresponding to pins 35 of FIG. 2A). A metal shutter rotatably movable in the direction of arrow Z4 hingedly rotates relative to central points 421 and 423 of the housing 402 and is spring loaded by a torsion spring 425 to stay in an initial closed position as shown in FIG. 6A. Moving the shutter in the direction of arrow Z4 exposes top and bottom windows 452, 454, respectively exposing the magnetic surfaces 412(only one is shown here) of magnetic disk 410. An anti-rotation tab 406 extends from the housing 402 to fit within a mateable edge groove 466 in the cylindrical slot 465 in cartridge 460. Pins 435 fit about the spindles 112, 212, 312 shown and described in reference to the previous figures. Although not shown, the door 105 shown in FIG. 3A can be used with the embodiment of FIGS. 6A–6E.

In operation inserting disk adapter cartridge 460 into a typical disk drive(such as the one shown in FIG. 3F) allows for disk drive shutter actuator 470(corresponding to the disk drive shutter actuator 170 of FIG. 3F) to move in the direction of arrow Z1, abutting against the coin disk shutter actuator 480(that moves in the direction of arrow Z3) having a through-hole opening 485 to catch about the raised pin 490 on the coin disk shutter 420. Pin 490 slides downward in the direction of arrow Z2 causing shutter 420 to pivot about center point 421 exposing magnetic media surface 412 of magnetic disk 410.

Figure 7B:
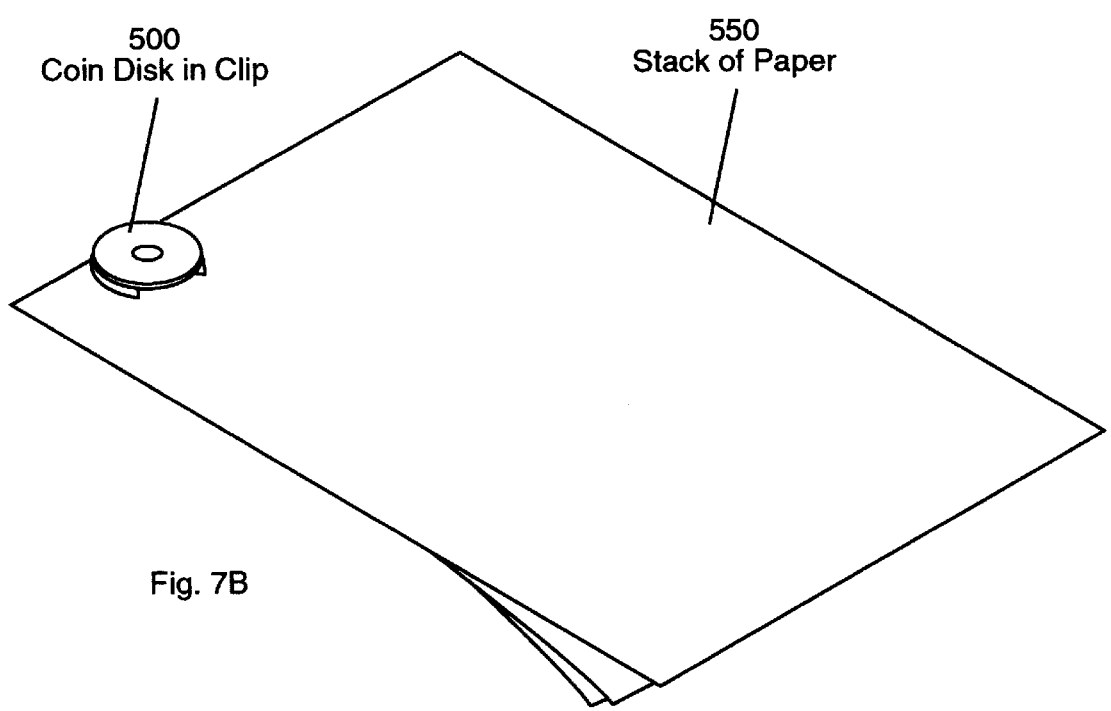
FIG. 7B shows the attachment device of FIG. 7A being used with a stack of papers.

FIG. 7A is an enlarged exploded view 500 of a novel attachment device for the novel coin disk 10 of the preceding figures. FIG. 7B shows the attachment device 500 of FIG. 7A being used with a stack of papers 550. Referring to FIGS. 7A–7B, a novel attachment device can be formed from injection molded plastic and the like and includes raised arc sides 510 and 520 which tightly allow the side edges 22, 26 of the coin disk to snap within when moved in the direction of arrow M. The arc sides 510 and 520 have respective bottom surface portions 515 and 525. A bendable paper clip portion 530 movable downward in the direction of arrow N allows the attachment device 500 to attach to an edge of a stack of papers 550, cardboard, clipboard, and the like.

Although the preferred embodiment can use the magnetic disks described in reference to the 3 & ½ inch floppy disks having 1.44 MB described in reference to FIGS. 1A–1B, the subject invention can use magnetic disks manufactured in accordance with recently introduced high memory capacity floppy disks. The coin disk of the subject invention can be manufactured with the technology used in the high-capacity 3 & ½ inch floppy disks having a 200 MB(megabyte both sides) recording capacity such as the HiFD manufactured jointly by Sony Corp. and Fuji Photo Film Co. Mac Publications "HiFD to support new, old floppies", MacWEEK News, Vol. 11 Issue 40, Oct. 17, 1997, pages 1–3. Additionally, the subject coin disk can be manufactured with the technology of the 3 & ½ inch SuperDisk™ that have a 120 MB capacity manufactured by Imation Corporation. Imation Brochure Super Disk™ LS-120 Diskettes, 1997. Thus, the approximately 1 inch diameter magnetic coin disks using either the HIFD or SuperDisk™ technology would have greater capacity than the conventional standard 3 & ½ inch floppy disks.

While the preferred embodiment has described using removable coin shaped magnetic memory disks, the invention can be applicable to other types of computer storage media such as but not limited to compacts disks(CDs), and the like, where coin shaped compact disks can be used in place of the magnetic coin disks and have a higher density for storage.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An adapter cartridge for personal computers, comprising, in combination:

a cartridge in the shape of a floppy diskette, said cartridge being operable in a floppy disk drive;

a drive plate rotatably attached to a central portion of the cartridge, the drive plate having a side slot about a rotatable axis, and having a drive plate diameter;

an insertable and removable coin shaped magnetic disk having a disk diameter rotatably connected to the cartridge, the drive plate diameter being substantially equal to the disk diameter; and a drive system for directly allowing the disk to rotate simultaneously at substantially an identical angular velocity with the drive plate, wherein inserting the cartridge into a computer disk drive to access the side slot allows the coin shaped magnetic disk to record and play back data and the magnetic disk is removable for separate transport and storage from the cartridge, wherein said drive system includes a spindle for engaging the coin shaped magnetic disk; said spindle being laterally offset from said rotatable axis of said drive plate in a direction parallel to a recording surface of said coin shaped magnetic disk.

2. The adapter cartridge of claim 1, wherein the cartridge includes exterior dimensions of: approximately 3.55 inches by approximately 3.70 inches by approximately 0.13 inches thick.

3. The adapter cartridge of claim 2, wherein the coin shaped magnetic disk includes:

an approximately 1 inch diameter.

4. The adapter cartridge of claim 1, further including:

said spindle for allowing the magnetic disk to be removably attached to the cartridge so that that the magnetic disk is side by side to the drive plate.

5. The adapter cartridge of claim 1, wherein the drive system includes:

a belt connecting the rotating drive plate to the magnetic disk so that the drive plate and the magnetic disk simultaneously rotate in the same direction.

6. The adapter cartridge of claim 1, wherein the drive system includes:

a plate wheel for supporting the magnetic disk, the plate wheel having rough side edges which abut against rough side edges on the drive plate, so that rotating the drive plate in one direction simultaneously rotates the plate wheel in an opposite direction.

7. The adapter cartridge of claim 6, wherein the plate wheel includes:

said spindle for allowing the magnetic disk to be removably attached to the cartridge so that that the magnetic disk is side by side to the drive plate.

8. The adapter cartridge of claim 1, wherein the drive system includes:

a gear wheel for supporting the magnetic disk, the gear wheel having side teeth which mateably interconnect to side teeth on the drive plate, so that rotating the drive plate in one direction simultaneously rotates the gear wheel in an opposite direction.

9. The adapter cartridge of claim 8, wherein the gear wheel includes:

said spindle for allowing the magnetic disk to be attached to the cartridge so that the magnetic disk is side by side to the drive plate.

10. The adapter cartridge of claim 1, further comprising:

a substantially cylindrical housing for supporting the magnetic disk therein, the housing being insertable and removable from a side portion of the cartridge, the housing having a movable shutter which exposes magnetic sides of the magnetic disk when the cartridge is inserted into the personal computer disk drive.

11. The adapter cartridge of claim 10, wherein the housing further includes:

a spring means for allowing the shutter to be biased shut, closing of access windows to magnetic sides of the magnetic disk.

12. The adapter cartridge of claim 10, wherein the housing further includes:

a tab portion extending out from the housing so that when the housing in mounted in the cartridge, the housing remains stationary to the cartridge.

13. The adapter cartridge of claim 1, further comprising:

an attachment device sized slightly larger than the disk for allowing only the disk to be attached to a planar sheet.

14. The adapter cartridge of claim 13, wherein the attachment device includes:
- a compartment for receiving side edges of the coin disk therein; and
- a clip means for attaching the device to an edge of the planar sheet.

15. The adapter cartridge of claim 13, wherein the planar sheet is chosen from at least one of:
- a paper, a stack of papers, a cardboard sheet, a stack of cardboard, and a clipboard.

16. An adapter cartridge for personal computers, comprising in combination:
- a cartridge in the shape of an approximately 3 and ½ inch floppy diskette;
- a drive plate rotatably attached to a central lower portion of the cartridge, the drive plate having a side slot about a rotatable central axis, and having a drive plate diameter;
- a removable coin shaped magnetic disk having a disk diameter, and being rotatably connected to the cartridge, the drive plate diameter being substantially equal to the disk diameter, the coin shaped magnetic disk being able to be separately and easily be inserted and removed from a mateable round opening within the cartridge; and
- a drive system for directly allowing the coin shaped magnetic disk to rotate simultaneously in a side-by-side position at substantially an identical angular velocity with the drive plate, wherein inserting the cartridge into a computer disk drive to access the side slot allows the coin shaped magnetic disk to record and play back data, and the magnetic disk can be removed for separate transport and storage from the cartridge, wherein said drive system includes a spindle for engaging the coin shaped magnetic disk; said spindle being laterally offset from said rotatable axis of said drive plate in a direction parallel to a recording surface of said coin shaped magnetic disk.

17. The adapter cartridge of claim 16, wherein the coin shaped disk includes:
- an approximately one inch diameter.

* * * * *